US006991298B2

(12) United States Patent
Ording et al.

(10) Patent No.: US 6,991,298 B2
(45) Date of Patent: Jan. 31, 2006

(54) COMPOSITE BICYCLE RIM WITH SEAMLESS BRAKING SURFACE

(75) Inventors: Andrew Ording, Indianapolis, IN (US); Joshua R. Poertner, Indianapolis, IN (US)

(73) Assignee: Compositech, INC, Speedway, IN (US)

( * ) Notice: Subject to any disclaimer, the term of this patent is extended or adjusted under 35 U.S.C. 154(b) by 61 days.

(21) Appl. No.: 10/306,750

(22) Filed: Nov. 27, 2002

(65) Prior Publication Data
US 2003/0107260 A1 Jun. 12, 2003

Related U.S. Application Data

(60) Provisional application No. 60/334,220, filed on Nov. 29, 2001.

(51) Int. Cl.
*B60B 21/00* (2006.01)
(52) U.S. Cl. .............. 301/30; 301/95.102; 301/95.106; 29/894.35
(58) Field of Classification Search ................. 301/30, 301/33, 95.101, 95.102, 95.103, 95.104, 301/95.106, 99; 29/894.33, 894.35, 894.351
See application file for complete search history.

(56) References Cited

U.S. PATENT DOCUMENTS

| 697,118 | A |   | 4/1902  | Van Horn |
|---|---|---|---|---|
| 810,860 | A |   | 1/1906  | Heart |
| 1,968,005 | A |   | 7/1934  | Swain |
| 1,969,088 | A |   | 8/1934  | Maranville |
| 2,854,743 | A | * | 10/1958 | Gollwitzer .................. 228/125 |
| 3,452,798 | A |   | 7/1969  | Ravreby |
| 3,656,531 | A |   | 4/1972  | Ross et al. |
| 3,732,951 | A |   | 5/1973  | Hata et al. |
| 3,862,779 | A |   | 1/1975  | Jayne |
| 4,280,736 | A |   | 7/1981  | Raudman |
| 4,508,392 | A |   | 4/1985  | LeBlond et al. |
| 4,639,046 | A |   | 1/1987  | Oleff et al. |
| 4,732,428 | A |   | 3/1988  | Monte |
| 4,793,659 | A |   | 12/1988 | Oleff et al. |
| 4,835,857 | A |   | 6/1989  | Michelotti |
| 4,844,552 | A |   | 7/1989  | Tsygankov et al. |
| 4,919,490 | A |   | 4/1990  | Hopkins et al. |
| 4,938,540 | A | * | 7/1990  | Sacks .......................... 301/99 |
| 4,983,430 | A |   | 1/1991  | Sargent |
| 4,994,675 | A |   | 2/1991  | Levin et al. |
| 5,061,013 | A |   | 10/1991 | Hed et al. |
| 5,080,444 | A |   | 1/1992  | Hopkins et al. |

(Continued)

FOREIGN PATENT DOCUMENTS

DE        30 16 862        11/1981

(Continued)

OTHER PUBLICATIONS

Specialized Bicycle Components Accessory Catalog, 1990.

(Continued)

*Primary Examiner*—Russell D. Stormer
(74) *Attorney, Agent, or Firm*—E. Victor Indiano; Indiano Vaughan, LLP

(57) ABSTRACT

A fiber resin plastic (FRP) based bicycle rim includes an FRP body and a metal tire receiving ring. The FRP body has first and second side surfaces, an annular outer edge surface, and an annular inner edge surface. The annular inner edge surface includes at least two spoke receiving ports for receiving and supportively coupling at least two spokes to the FRP body. The metal tire receiving ring is coupled to the FRP body and is disposed radially outwardly of the FRP body. The tire receiving ring includes first and second, generally parallel continuous braking surfaces.

9 Claims, 4 Drawing Sheets

U.S. PATENT DOCUMENTS

| | | |
|---|---|---|
| 5,104,199 A | 4/1992 | Schlanger |
| 5,246,275 A | 9/1993 | Arredondo, Jr. |
| 5,249,846 A | 10/1993 | Martin et al. |
| 5,415,463 A | 5/1995 | Olson et al. |
| 5,490,719 A | 2/1996 | Lew |
| 5,540,485 A | 7/1996 | Enders |
| 5,564,793 A | 10/1996 | Whiteford |
| 5,682,677 A * | 11/1997 | Mahoney .................. 29/894.35 |
| 5,845,400 A * | 12/1998 | Takamoku ............. 29/894.354 |
| 5,975,645 A | 11/1999 | Sargent |
| 6,048,035 A * | 4/2000 | Chen ............................ 301/30 |

FOREIGN PATENT DOCUMENTS

| | | |
|---|---|---|
| FR | 2 583 680 | 12/1986 |
| FR | 2702707 | 9/1994 |
| WO | 93/09963 | 5/1993 |

OTHER PUBLICATIONS

Proven Performance, Hed Design, 1989 Product Price List.
ZIPP 3000 Composite Molded Wheel Specification Sheet.

* cited by examiner

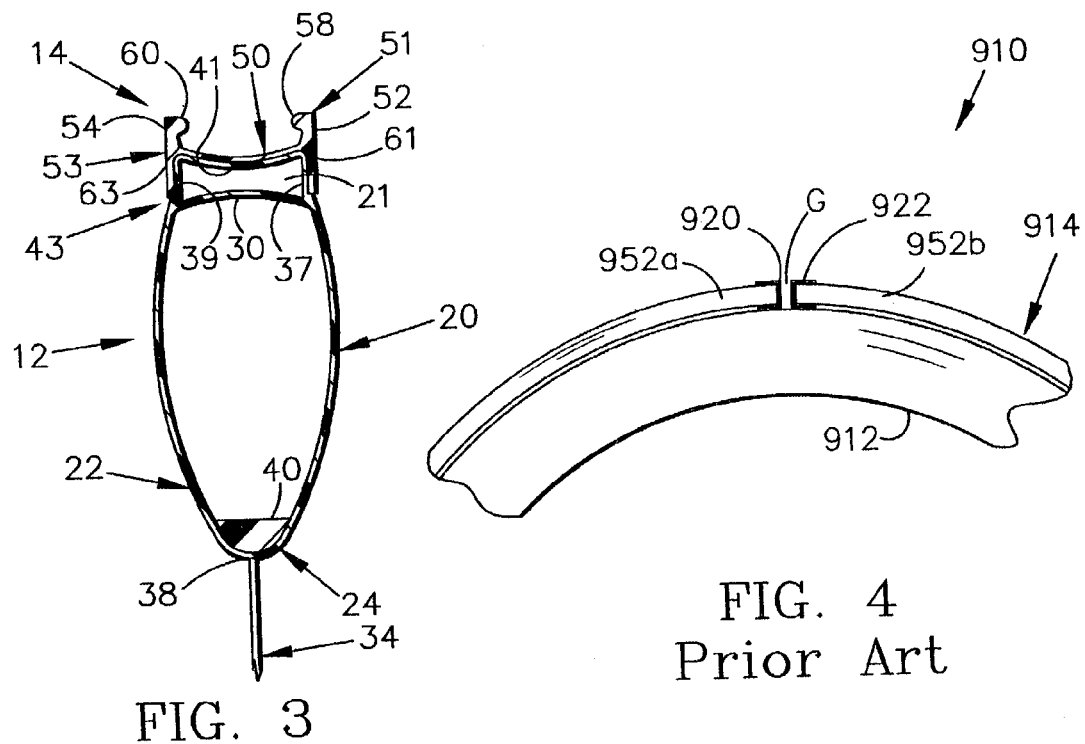
FIG. 3
FIG. 4
Prior Art
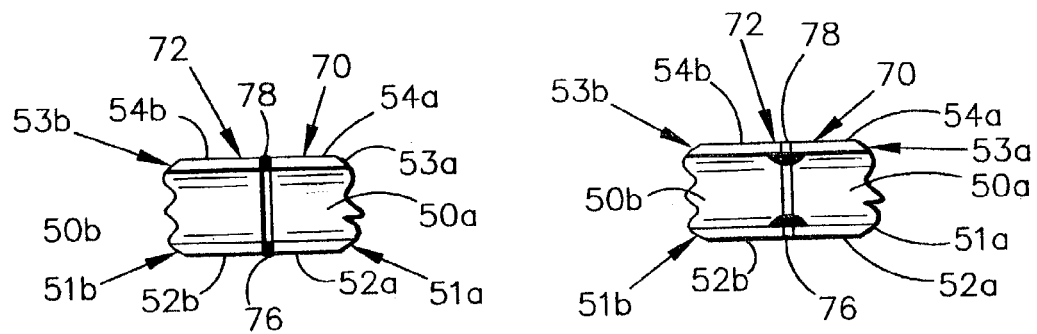
FIG. 5c
FIG. 5d

COMPOSITE BICYCLE RIM WITH SEAMLESS BRAKING SURFACE

I. PRIORITY CLAIM

The instant application claims priority to Ording and Poertner, U.S. Provisional Patent Application Ser. No. 60/334,220 filed Nov. 29, 2001.

II. TECHNICAL FIELD OF THE INVENTION

The present invention relates to rims for bicycle wheels, and more particularly, fiber-reinforced plastic based bicycle wheels rims, and most particularly carbon fiber-based bicycle wheel rims.

III. BACKGROUND OF THE INVENTION

Bicycle wheels and rims therefor have been in use for well over a century. Heretofore, most bicycle rims have been made of steel or aluminum. However, in the past few decades, some bicycle rim manufacturers have begun to produce bicycle rims from other materials, such as fiber reinforced plastics (FRPs), including carbon fiber, fiberglass, and nylon fibers, that are mixed in a resin such as epoxy-based resins, phenolic-based resins and/or ester-based resins. Of these composite rims, some have been comprised entirely of FRP composite materials ("full composite wheels"), whereas others have incorporated components of different materials in addition to FRP composites ("multi-component rims").

An example of a full carbon fiber composite rim is shown in Hed and Haug, U.S. Pat. No. 5,061,013. Other examples of bicycle wheel rims made entirely of a composite material are the ZIPP® 245 and 280 rims, and the ZIPP® 330 and 360 rims, that are available from the assignee of the instant application, Compositech, Inc. of 1180 North Main Street, Speedway, Ind. 46224.

Although full composite wheels represent the current state-of-the-art in high-tech bicycle rims because of their strength, their light-weight and their aerodynamically efficient profiles, bicycle rims made entirely of FRP composites are not well suited to all uses. In particular, one difficulty with known full composite bicycle rims, is that it is difficult to form a full FRP composite fiber rim that will accept standard beaded bicycle tires. Rather, most completely FRP composite wheels are designed for use with "sew up" tires that are actually glued to the rim.

In view of the limitations of full FRP composite rims, multi component rims have been produced that contain both an FRP composite component and a metallic component. An example of such a rim is shown in Sargent U.S. Pat. No. 5,975,645 (the '645 patent rim"), which patent is also assigned to Compositech, Inc., the assignee of the present invention. The '645 patent rim includes a deep drawn structural carbon fiber body composite that provides strength and a favorable aerodynamic profile to the rim. An aluminum tire-engaging hoop rim is coupled to the radially outwardly facing surface of the carbon fiber body portion. The aluminum tire-engaging hoop includes a pair of lips for engaging the beads of a conventional bicycle tire.

Although the '645 rim has proven to be a valuable addition to the assignee's product line, and has been well received by the Applicant's customers, room for improvement still exists.

In particular, one area where room for improvement exists relates to the manner in which the metal hoop is constructed and attached to the carbon fiber rim body. The aluminum hoops for rims produced by the assignee, Compositech, Inc Prior to the instant invention, that were most similar to those shown in the '645 patent were created by forming a generally linear section, that was cut to a size generally equal to the finished circumference of the hoop. The hoop was then bent into its circular-hoop shape, until the first and second ends of the formerly linear section were placed adjacent to each other. The two ends of the hoop were then clamped together. This method of manufacturing the hoop has the disadvantage of leaving a slight gap in the hoop where the first and second ends of the hoop are joined together. It was found by Applicants that this gap created between the two former ends of the aluminum hoop resulted in a rim that, although having fine performance characteristics, was difficult to manufacture, and which was still subject to improvement in its longevity.

It is therefore one object of the present invention to produce an FRP based bicycle rim having a metal rim attached thereto that improves upon the prior known '645 patent rim and other prior art rims by creating a wheel with no discontinuity in the braking surface of the rim.

IV. SUMMARY OF THE INVENTION

In accordance with the present invention, a fiber reinforced plastic (FRP) based bicycle rim comprises an FRP body having first and second side surfaces and annular outer edge surface. The annular inner edge surface includes at least two spoke receiving ports for receiving and supportively coupling at least two spokes to the FRP body. A metal tire receiving ring is coupled to the FRP body radially outwardly of the FRP body. The tire receiving ring includes first and second, generally parallel continuous braking surfaces.

Preferably, the tire receiving ring includes a first end, a second end and a joinder material disposed between the first and second ends. The joinder material is treatable to extend between the first and second ends in a continuous manner. In a most preferred embodiment the joinder material comprises a molten or melted portion of one or both ends of tire receiving ring wherein the two ends are flash butt welded together Also in accordance with the present invention, a method is provided for manufacturing an FRP based bicycle rim. The method includes the step of providing a metal tire member having a first end, a second end, an FRP body engageable portion, a first braking surface portion and a second braking surface portion. The second braking surface portion extends in a plane generally parallel to the first braking surface portion. The first end of the tire receiving member is joined to the second end of the tire receiving member with a joinder material to form a tire receiving ring having a joint between the first and second ends of the tire receiving ring. The surfaces of the first and second braking surfaces are treated so that the joint between the first and second ends of the tire receiving ring forms a continuous first braking surface and a continuous second braking surface. An FRP rim body is provided having first and second side surfaces, an annular inner edge surface that includes at least two spoke receiving ports for receiving and supportively coupling at least two spokes to the FRP rim body. The FRP rim body also includes an annular outer edge surface. The tire receiving ring is joined to the FRP rim body.

Preferably, the first and second ends of the tire receiving ring are joined by welding the respective first and second braking surfaces of the first and second ends together, with the surfaces being treated by machining the surfaces to form continuous metallically bonded first and second braking surfaces.

Also, the step of joining the FRP rim body to the tire receiving ring preferably includes the step of providing a mold having a cavity for receiving the FRP rim body in a less than fully cured state and the tire receiving ring that is joined to the rim body. Heat and/or pressure are applied to the joined FRP rim body and the tire receiving body in the mold cavity to cure the FRP rim body and to mechanically bond the tire receiving ring to the FRP rim body.

One feature of the present invention is that it provides a light-weight FRP based wheel rim that includes a metal tire receiving ring, having first and second continuous braking surfaces. This feature has the advantage of providing a more reliable, smoother braking surface than was achievable with prior known bicycle rims. As discussed above, the known prior art rim of this type had a slight gap between the first and second ends of the tire receiving ring, when the tire receiving ring was joined to the FRP rim body. Although the ends of the tire receiving ring were joined in a manner that placed the ends of the braking surface in an adjacent, planar relationship, the stresses imposed on the braking surface had the potential to increase the gap between the ends of the tire receiving ring, and had the potential to cause the surfaces to lose their planarity at the juncture between the first and second ends. This erosion of the planarity at juncture between the braking surfaces tended to result in decreased braking performances, and had the potential to decrease the useful life of the product. Useful life could be decreased by the increased gap making it more likely that the brake pad would become snagged or "catch" upon an edge of the braking surface, thereby widening the gap between the two ends of the braking surface.

The method of producing a rim of the present invention, and the rim produced thereby overcomes this problem by creating a strong metallic bond between the first and second ends of the tire ring at the braking surface, which bond can be machined so that the tire ring is effectively continuous, having no discontinuities between the first and second ends of the tire receiving ring. This continuous surface will likely result in a longer lasting rim having a reduced likelihood of premature degradation in its performance characteristics.

Another feature of the present invention is that the FRP based bicycle rim of the present invention is manufactured by a process wherein the tire ring is formed into a continuous hoop, which is then joined to a partially cured, FRP body portion in a mold. Heat and pressure are applied to the tire ring and FRP body in the mold, both to fully cure the FRP body portion, and to mechanically bond the FRP body portion to the ring.

This feature has the advantage of creating its own bond between the FRP body and the ring, to help better ensure that they maintain their structural integrity. Additionally, the heat and pressure applied in the mold, and the adjacent relationship of the FRP body tire receiving ring within the mold helps to better fit and mechanically bond the FRP body portion of the rim to the ring, to also thereby reduce the likelihood that the ring will become separated from the FRP body.

These and other features and advantages of the present invention will become apparent to those skilled in the art upon a review of the detailed description and drawings below, which represent the best mode of practicing the invention perceived presently by the Applicant.

V. BRIEF DESCRIPTION OF THE DRAWINGS

FIG. 3 is a sectional view taken generally along lines 3—3 of FIG. 2;

FIG. 4 is a side, partial view of a prior art rim;

FIG. 5c is a top view of the joint formed between the first and second ends of the invention;

FIG. 5d is another top view of the joint formed between the tire receiving ring of the present invention.

VI. DETAILED DESCRIPTION

Figure 1:
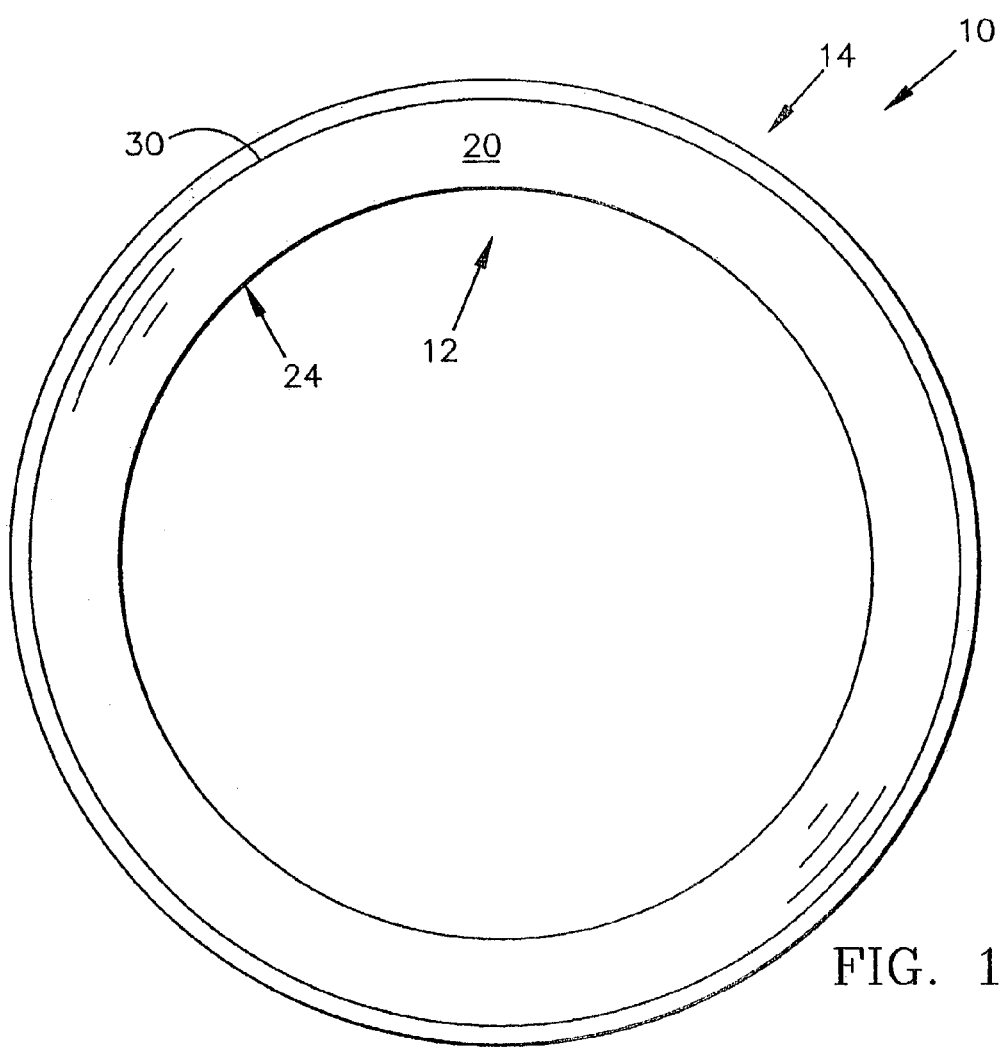
FIG. 1 is a side view of an FRP based bicycle rim of the present invention.

A fiber reinforced plastic (FRP) based bicycle rim 10 of the present invention is shown in the figures, as being comprised of two primary components, a carbon fiber body 12, that is circumferentially surrounded by an aluminum metal tire receiving ring 14. The tire receiving ring 14 is adapted for receiving the beads of a conventional tire, such as is disclosed in more detail in Sargent U.S. Pat. No. 6,975,645, the disclosure of which is incorporated by reference herein. As best shown in FIG. 3, the FRP body 12 includes a first bulbous side wall portion 20, and a second bulbous side wall portion 22 which is formed as a mirror image of the first bulbous side wall portion 20. The side wall portions 20, 24 have a significant radially extent in order to provide desirable aerodynamic properties to the rim. A cross member 30 extends between the two side walls 20, 22 and defines a cavity 21 into which a foam is placed. The foam, which fills cavity 21, serves as a core over which sheets of uncured carbon fiber are wrapped during the manufacture of the FRP body 12 to form the hoop 14 engaging crown portion 43 of the FRP body 12. As shown in FIG. 3, the crown 43 portion includes a first crown sidewall portion 37, a second crown sidewall portion 39, and a radially outward facing circumferential portion 41 that defines the annular outer edge of the FRP body. As it will be discussed in more detail below, the outer surface of the first crown sidewall portion 37 engages the axially inwardly facing surface of the downwardly extending leg 61 of first braking surface 52; the outer surface of the second crown sidewall portion 93 engages the axially inwardly facing surface of the downwardly extending leg 63 of the second braking surface; and the radially outwardly facing surface of the circumferential portion 41 engages the radially inwardly facing surface of the FRP body engaging portion 50 of the tire receiving ring 14.

An annular inner edge portion 24 is disposed at the radially inwardly positioned junction of the first and second bulbous side wall portions 20, 22. A plurality of spoke receiving ports 38 extend through the annular edge portion 24, and are provided for receiving spokes, such as spoke 34 therein. Although the number of spoke receiving ports is variable, it is envisioned by the Applicant that most rims it produces will typically include between 20 and 26 spoke receiving ports, that can accommodate a variable number of spokes, up to and including the number of spoke receiving ports. In many cases, less than all the ports are used as a reduction of the number of spokes used in a bicycle wheel is believed to improve the aerodynamic properties of the wheel.

As is best shown in FIG. 3, each of the first and second bulbous side walls 20, 22 are bowed outwardly, so that the width of the FRP body 12 bows outwardly until it reaches its maximum point, which is disposed approximately one third to one half of the distance from the radially outer most point (adjacent to the annular outer edge surface 41) to the radially inner most point (adjacent to the annular inner edge surface 24). As one moves along the side walls 20, 22 from the maximum width point, toward the radially outer portion, it will be noted that the width of the FRP body 12 decreases.

Figure 2:
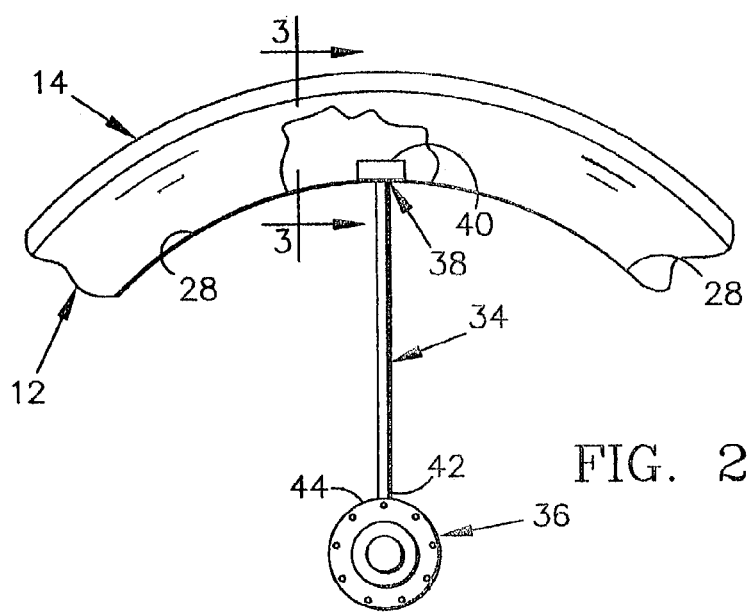
FIG. 2 is a side view, broken away of the rim of the present invention to which a spoke and hub are attached.

As is best shown with respect to FIGS. 2 and 3, the FRP bicycle rim 10 of the present invention is designed for use with spokes 34 for connecting the rim 10 to a bicycle hub 36 containing an axle (not shown) that is coupled to a frame member, such as a front fork (not shown) of a bicycle (not shown). The spokes 34 include a first end 31 that is received by a spoke receiving port 38. An adjustably axially postionable head 40 (similar to a nut for a bolt) can be coupled to the first end of the spoke for securing the spoke 34 to the FRP body 12, and for providing a tensioning mechanism for exerting an appropriate tension on the spoke 34. The second end 42 of the spoke engages a hub aperture 44.

The FRP rim 10 of the present invention is designed so that the spoke 34 can be supportively coupled to it. By "supportively coupled" it is meant that the forces that are exerted by the spoke on the rim 10 are exerted on the FRP body portion 12 itself, rather than on the tire receiving ring 14, or any other component of the rim 10. Preferably, the FRP body 12 and spoke receiving port 38 are sized, configured, and designed for absorbing these force loads, so as to obviate the need for other force-absorbing components to be added to the rim.

One benefit of designing the FRP body 12 to be strong enough to absorb and withstand the forces imposed by the spoke 34, is that it permits the manufacturer to make the tire receiving ring 14 from a thinner, more light-weight material, as the receiving ring 14 need not be reinforced, or thickened to receive the high-point-of-pressure types of forces exerted to the spoke 34 oil the rim 10. As an example of this thinness, the Applicant has found that a base portion 50 which is only about 1 mm thick will perform well in the present invention. By contrast, if the head of the spoke were secured to the base portion 50 (rather than the FRP body), the base portion would likely need to be at least about 3 mm thick, to be strong enough to support the spoke 34 head appropriately.

As best shown in FIG. 3, the FRP body 12 includes a tire rim receiving crown portion 43 that includes the concavely shaped annular outer edge member and the upper end portions 45, 47 of the bulbous sidewalls 20, 22. The upper end portion 37, 39 (above cross member 30) are relatively recessed, compared to the remainder of the side walls 20, 22 for receiving the downwardly extending leg portions 61, 63 of the tire receiving ring 14. It will be noticed that the outer surfaces of the upper end portion 37, 39 and annular outer edge 41 are shaped, sized and positioned for matingly engaging, and being interiorly received by the underside surface of the complimentarily shaped, concave base portion 50 and downwardly extending leg portions 61, 63 of the generally H-shaped (in cross-section) aluminum tire receiving ring 14.

The tire receiving ring 14 is generally H-shaped in cross-section, and includes a generally axially extending, circumferential, FRP body engaging base portion 50, that forms the cross leg of the "H". The FRP body engaging portion 50 is generally concave, and has a radially inwardly facing surface for matingly engaging the surface of the radially outwardly facing surface of the annular outer edge of the FRP body 12. A first braking member 51 (which forms one upright led of the "H") includes an axially outwardly facing first braking surface 52, a radially inwardly extending lower leg portion 37, that extends generally perpendicularly to the FRP body engaging base portion 50 of the tire engaging ring 14, and is disposed adjacent to one edge of the FRP body engaging base portion 50. A second braking member 53 includes an axially outwardly facing second braking surface 54, and a radially inwardly extending lower leg portion 63, and extends in a plane generally parallel to the first braking member 51 and braking surface 52, and is disposed at the opposite edge of the axially extending base portion 50.

The axially outwardly facing first and second braking surfaces 52, 54 comprise the actual brake engaging surfaces that the bicycle brake engages in order to increase the frictional resistance between the brake and the rim 10, to thereby stop the rotation of the bicycle wheel, and hence, stop the bicycle. As best shown in FIG. 3, a first bead 58 is disposed at the distal end of the first braking surface 52, and a second bead 60 is disposed at the distal end of the second braking surface 54. The first and second beads 58, 60 are provided for engaging a corresponding bead of the conventional bead-type tire to thereby form a mechanical interlock between the beads 58, 60 of the tire receiving ring 14, and the beads of the tire (not shown) which is held in engagement largely through the air pressure within the tire.

The braking surfaces 52, 54 are continuous, seamless braking surfaces about their entire area, and contain no gaps or discontinuities in any portions of the first and second braking surfaces 52, 54. To better understand the "continuous braking surfaces 52, 54" of the tire receiving ring 14 of the present invention, it is helpful to first compare it with an example of a prior art rim known to Applicant. The prior art rim is shown in FIG. 4.

FIG. 4 represents prior art wheel of the type constructed in accordance with teachings of the Sargent '645 patent. It should be noted that the tire receiving ring 914 has a different cross-sectional profile then the ring 14 of the present invention, the ring 14 of the present invention representing a significant improvement thereover.

The tire receiving ring 914 is shown being attached and fitted on to a FRP rim body 912. In order to create the tire receiving ring 914, a generally linear ring precursor is formed, and cut to an appropriate length, so that it includes a first end 920, and a second end 922. The ring 914 is then bent into a circle, with the first end 920 being joined to the second end 922 with a mechanical clamping mechanism, that clamps the base portion of the first end 920, to the base portion of the second end 922. The first and second ends 920, 922 are placed in a close, abutting relationship so as to minimize the width of the gap G that exists between the first and second ends 920, 922. Nonetheless, a gap G still exists in the braking surface between sections 952a, 952b of the braking surface. Although the size of the gap G shown in FIG. 4 is highly exaggerated for illustrative purposes, it was found by Applicant that it was often difficult to clamp the two ends 920, 922 of the ring together in a manner wherein some sort of gap G did not exist, or alternately, to clamp the first end 920 to the second end 922 in a manner wherein the braking surface 952a, 952b in the areas adjacent to the gap G were perfectly co-planar.

By using good manufacturing practices, the gap G was reduced to an insignificant distance when a particular prior art wheel 910 was manufactured. Nonetheless, a possibility existed that the size of the gap G could increase over time. It was found that frictional forces exerted on the tire engaging ring 914 by the brakes of the bicycle, when coupled with the expansion and contraction of the tire receiving ring 914 caused by the heat produced by the frictional engagement of the bicycle brake, would, over time, have the potential to either cause the gap G to increase in dimension, or else, would result in the brake surfaces 952a, 952b losing their co-planarity. Such a loss of co-planarity had the potential to result in irregular, non-smooth braking behavior, if the caliper of the bicycle brake becomes "snagged" at an edge of the tire receiving brake surfaces 952a or 952b, as the caliper slides across the gap G. This less than smooth braking behavior would tend to diminish the performance characteristics of the wheel, and therefore, in the opinion of especially particular users, would reduce the effective life span of the FRP based bicycle rim 910. In any event, room for improvement exists to overcome the problems presented by this gap G.

Figure 5A:
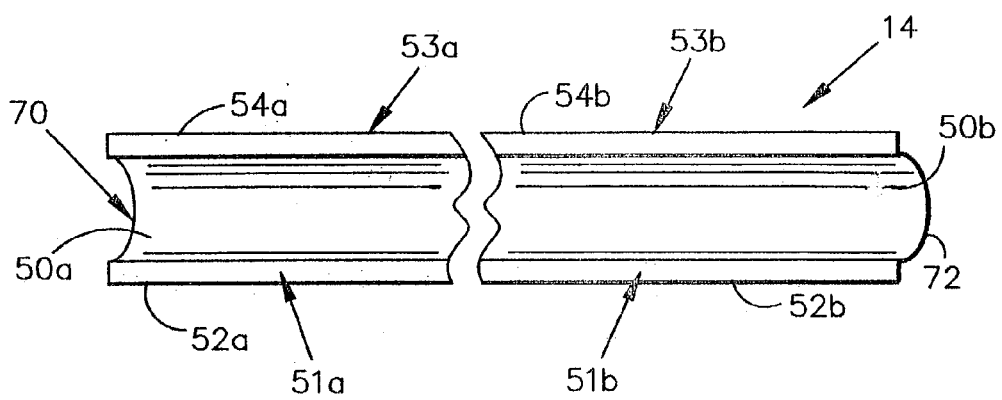
FIG. 5a is a top view of a tire receiving ring member, prior to being bent into a hoop.
Figure 5B:
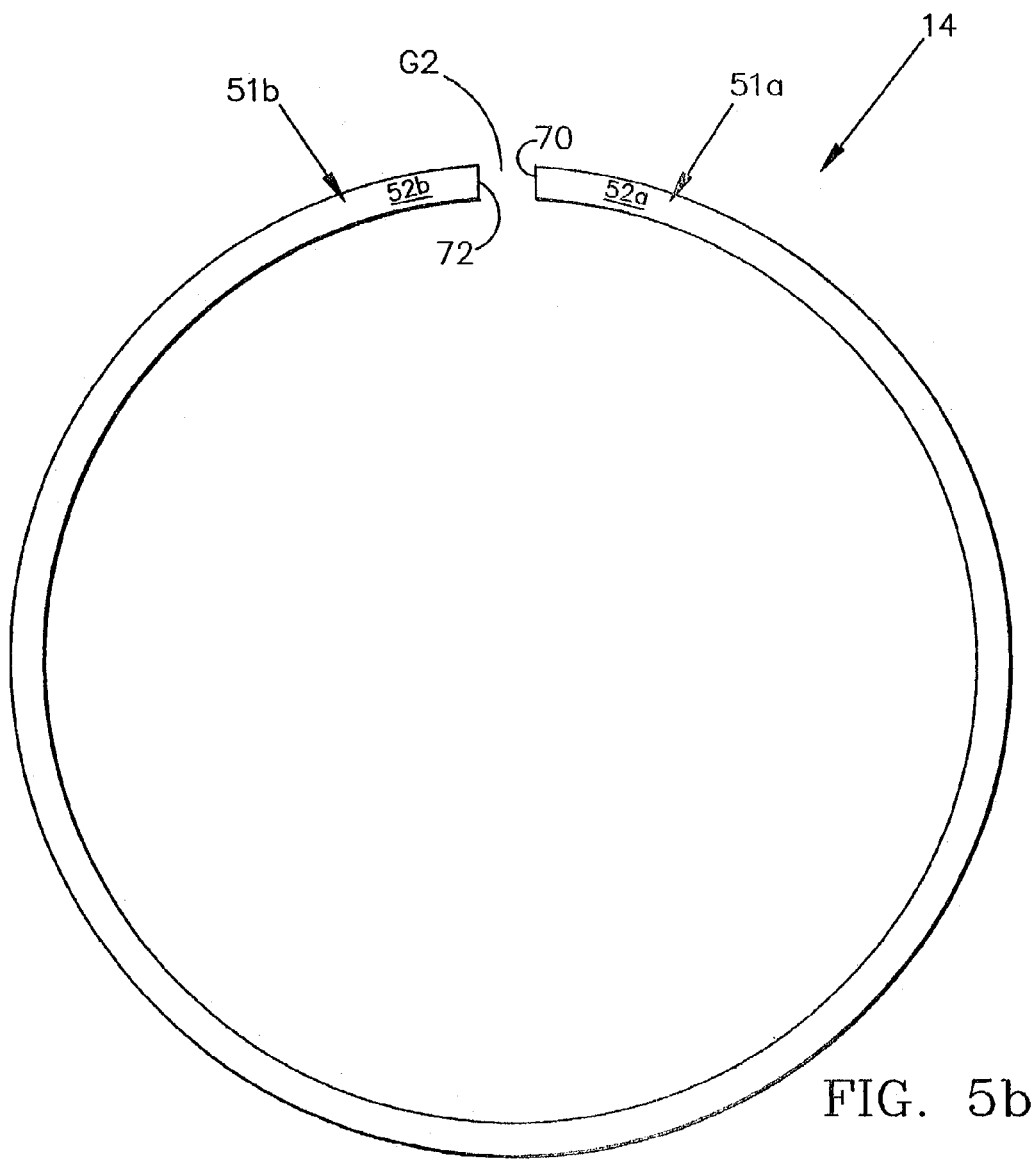
FIG. 5b is a side view of the tire receiving member after being bent into a hoop, but before the joinder together of its two ends.

Turning now to FIGS. 5a–5b, the manufacture of the tire receiving ring 14 will be described. Turning first to FIG. 5a, a generally linear, aluminum tire receiving member is cut to shape so that it includes first end 70 and second end 72. The cross-sectional shape of the tire receiving member is best shown in FIG. 3. Continuing onward with FIG. 5a, it will be noted that the parts of the tire receiving member are generally identical to those shown in FIG. 3. However, for purposes of this explanation, those components of the ring, such as the first and second braking portions 51a, 53a, of the first and second braking surfaces 52a, 54a and the base portion 50a that are located near the first end will be designated with an "a" suffix; whereas those components, including the first and second braking portions 51b, 53b, first and second braking surfaces 52b, 54b and the base portion 50b that are located adjacent the second end 72, will be designated with a "b" suffix. It will be appreciated that when a member is fully formed into a ring, the "ends" of the member 70, 72 will lose much of their significance, as the tire receiving member will comprise a unitary, continuous loop, which, from the perspective of the braking surfaces 52, 54 is continuous and gap free.

After the generally linear tire receiving member of FIG. 5a is formed, and cut to a length generally equal to the circumferential length of the final hoop, the tire receiving member 14 is bent upon a mandrel or other tool to change it from its generally linear configuration as shown in FIG. 5a, to its generally circular hoop-like configuration shown in FIG. 5b.

Turning now to FIG. 5b, the ring 14 is shown in its hooped configuration, where its first end 70 is placed adjacent to its second end 72, so that the first braking surface 52a of the first end 70 is generally co-planar with the first braking surface 52b of the second end; and similarly, braking surface portions 54a, 54b of the second braking surfaces are similarly disposed to be co-planarly. A gap G2 exists between first and second ends 70, 72. The size of the gap G2 shown in FIG. 5 has been exaggerated for illustrative purposes. However, in practice, the first and second ends 70, 72 are placed up against each other, to abut each other, to thereby reduce the width of the gap G2.

After the ends, 70, 72 are placed adjacent to each other, the two ends of the first brake surface 51a, 51b and the second brake surface portion 53a, 53b are joined together. Preferably, the ends 51a, 51b; 53a, 53b are joined together through the use of a joinder material, such as a welding material, wherein the ends of the brake surface portion are welded together. In the welding process, the metal, at the points to be joined, is melted. Additionally, a molten metal, (preferably molten aluminum for an aluminum ring 14) is added as a filler or joinder material, to form a first brake surface joint 76, and a second brake surface joint 78.

Most preferably, the two ends 70, 72 of the of the precursor un-joined hoop are joined together by flash butt welding, wherein the joinder material comprises the material of the ends 51a, 51b, 51c and 51d of the brake surfaces. To flash butt weld the ends together, the one or both ends 51a, 51b, 51c, 51d are heated so that the aluminum at the ends is melted, or semi-molten. The ends 51a, 52a of the first end are then pressed (butted) under pressure against the ends 51b, 52b of the second end so that the molten aluminum of the two ends co-mingles. When the metal cools, the first and second ends are metallically joined to each other, and appear much like that shown in FIG. 5c. Since flash-butt welding will not produce a smooth joint, finishing, such as by machining, is usually still necessary before the wheel is ready for use.

As shown in FIG. 5c, first and second brake surface joints appear as balls or globs of material, that comprise material melted from the first and second brake portions 51a, 53a of the first end 70; the first and second brake portions 51b, 53b of the second end 72, and the additional molten filler (if any), and/or any flux (if any) that was used during the welding process.

Preferably, good welding practices are used to ensure that the joints 76, 78 are as strong as, or stronger than the remainder of the first and second brake surface portions 51, 53 that the joints 76, 78 are the strongest points of the hoop. Although the joint 76, 78 can be extended laterally across the base portion 50, the Applicants have found that the joint created by welding the brake surface portions 51, 53 is sufficiently strong to maintain the structural integrity of the hoop during the useful life of the bicycle rim 10.

The next step in the process of manufacturing the rim 14, is to treat the surfaces 52a, 52b, 54a, 54b and joint 76, 78 so that the first and second brake surfaces 52, 54 and joints 76, 78 form, respectively, first and second smooth, continuous braking surfaces, especially at the points where the first and second ends of the rim come together, which portion now comprises the area of the rim adjacent to the joints 76, 78. As will be described in more detail below, this machining preferably occurs after the ring 14 is joined to the FRB body portion 12, after the joined ring 14 and boy 12 are removed from the mold.

During the machining process, the brake surfaces 52, 54 are ground and polished so that the position of the joints 76, 78 is not apparent to one viewing the brake surfaces 52, 54, so that the brake surfaces 52, 54 appear as smooth, continuous surfaces having no discontinuities in the areas of the joints 76, 78. More importantly, the joints 76, 78 are preferably constructed so that no discontinuities are functionally apparent to a bicycle caliper brake that is engaging the brake surface 52, 54 during the application of the caliper to the brake surfaces 52, 54. This lack of discontinuities provides for a smooth, discontinuity-free braking surface of the rim.

Additionally, the strength of the joints 76, 78 maintains the respective positions of the braking surfaces 54a, 54b;

and 52a, 52b of the first and second ends in their co-planar, aligned position, not only in the time period shortly after the manufacture of the rim, but also during the useful life of the rim, as the joints 76, 78 are preferably strong enough to maintain the respective positions of the brake surface and with respect to each other during the use and operation of the rim 10.

Figure 6:
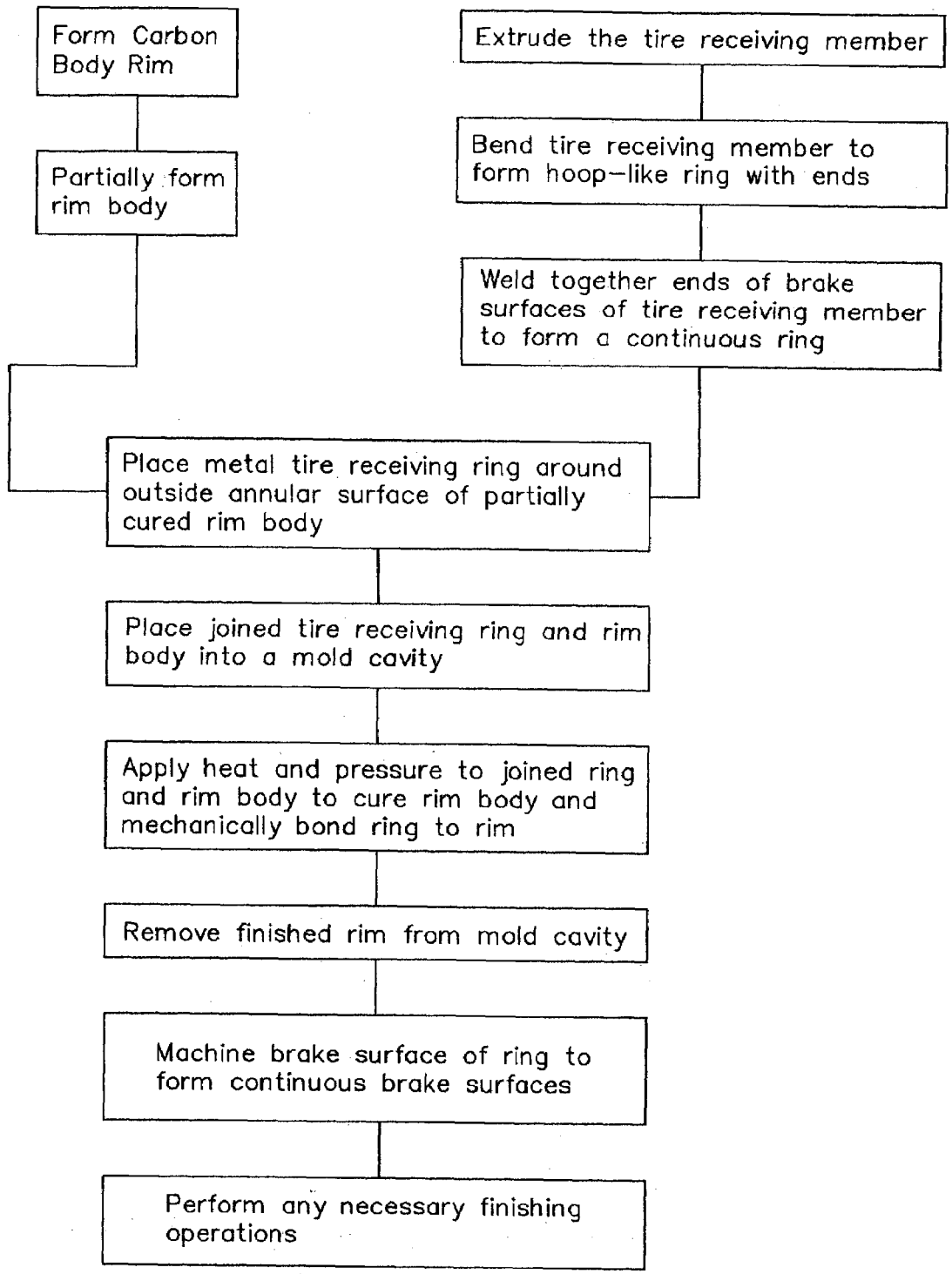
FIG. 6 is a flow chart illustrating the manufacturing process by which the bicycle rim of the present invention is produced.

Turning now to FIG. 6, a process by which the rim 10 of the present invention is manufactured will be described.

As discussed above, a tire receiving ring is formed by first extruding the tire receiving member (See FIG. 5a). The tire receiving member is then bent to form a hoop-like ring, with the ends 70, 72 of the ring abutting each other (See FIG. 5b). The ends 70, 72 of the brake surfaces 52, 54 of the tire receiving member 14 are then welded together to form a continuous ring. (See FIG. 5c).

At the same time, in a separate operation, the FRP rim of 10 is formed. As the Applicant's experience resides primarily with manufacturing carbon-fiber type FRP rims, the manufacturing process described below will be made with respect to carbon fiber type FRP rims, it being understood that some differences in the manufacturing process may exist if other FRPs are used.

The FRP rim is formed by laying up, in a mold, sheets of carbon fiber containing composite materials. The carbon body 12 can be formed through the use of a dry fiber, to which resin is added. Also, it can be done through a pre-preg system, wherein the resin is already placed in the fiber before it is molded. Further, one can also perform resin transfer when bladder molding the carbon fiber body 12. Alternately, the FRP body 12 can be injection molded with an injection moldable FRP such as nylon, polypropylene, polyethylene, with a glass fiber. A FRP glass fiber can be used in place of a carbon fiber. However, the use of a glass fiber would change the performance characteristics of the rim, although there would still be inherent side wall flex when mated with the aluminum rim 12.

As discussed above, the more common procedure for producing the carbon fiber body is that sheets of uncured carbon fiber material are laid up in a mold having the proper dimensions and shape. In most cases, the Applicants have found that a multi-layer carbon fiber wheel that utilizes different types of appropriately oriented carbon fiber materials tends to form the best and most structurally strong rim. When cured, the rim 12 comprises a carbon fiber laminate having the desired stress and sheer resistance, and ability to flex and bend, and absorb stress, in the appropriate direction. It should also be noted that the crown portion 43 of the carbon fiber body 12, including the upper portions 37, 39 and annular outer edge 41 can be added to the remainder of the components (e.g. side walls 20, 22 and cross member 24) in a secondary operation performed after the side walls 20, 22, and cross member 30 are formed.

After all the various carbon fiber resin layer is laid up in the mold, it is partially, but not fully cured. Typically, this partial curing occurs through the addition of heat and/or pressure within the mold.

The partially cured rim body 10, is then joined to the tire receiving ring 14 which, as discussed above, has already been bent into a hoop, with its end joined. Preferably, this joinder of the ring 14 to the body 12 takes place in the cavity of a mold that is designed to accommodate both the metal tire receiving ring 14 and the carbon fiber body 12. As is shown in FIG. 3, the tire receiving ring 14 and carbon fiber body 12 are joined together through the engagement of the radially inwardly facing surface of the tire with the axially outwardly facing annular outer edge surface 41 of the carbon fiber body 12, and the lower leg portions 61, 63 being matingly engaged with the upper edge portions 37, 39 of the side walls 20, 22. As alluded to above, the tire receiving ring 14 and carbon fiber body 12 are either joined together outside of a mold cavity, and then placed, together, within the mold cavity; or alternately, joined together within the mold cavity by placing the tire receiving ring 14 and carbon fiber body 12 within the mold cavity.

The next step in the process is that the mold cavity is closed, and heat and pressure is applied to the joint tire receiving ring 14 and rim body 12 to cure the carbon fiber rim body 12 from its less than fully cured state, to its fully cured state. Due to the fact that the carbon fiber rim body 12 cures primarily through a chemical cure process, wherein the resin component (e.g. epoxy materials) contained with the carbon fibers cure, the temperature and pressure that is exerted within the mold need not be that great. Applicants have found that temperatures in the range of between 150° F. and 500° F., and preferably in the range of between 250° F. and 350° F. are generally sufficient for most resin materials.

The finished rim can then be removed from the mold cavity after the carbon body rim is fully cured, and has cooled sufficiently so that the carbon fiber body rim 12 has had an opportunity to harden, Next, the brake surfaces 52, 54 of the tire receiving ring 14 are machined to form continuous brake surfaces wherein each of the brake surfaces 52, 54 is generally co-planar throughout its circumference, wherein the brake surfaces 52, 54 are devoid of any discontinuities or gaps.

Further, the part can then be finished by polishing or deburing as necessary. Additionally, the spoke receiving ports 24 can be formed within the inner annular edge of the carbon fiber body 12 after the rim 10 is removed from the mold, in the case where such ports were not formed into the annular inner edge during the process of the carbon fiber body rim 12.

Through the process described above, the FRP body bicycle rim of the present invention can be produced.

What is claimed:

1. A fiber resin plastic (FRP) based rim for a human powered vehicle comprising:
    an FRP body having first and second side surfaces, an annular inner edge surface and an annular outer edge surface, the annular inner edge surface including at least two spoke receiving ports for receiving and supportively coupling at least two spokes to the FRP body,
    a metal tire receiving ring coupled to the FRP body radially outwardly thereof, the tire receiving ring including first and second, generally parallel continuous braking surfaces
        wherein the tire receiving ring includes a first end, a second end, and a joinder material disposed between the first and second end, the joinder material being treatable to extend between the first and second ends in a continuous manner.

2. The rim of claim 1 wherein the joinder material comprises a weldable material for bonding the first end to the second end, the weldable material being grindable to permit the junction of the first end, second end and weldable material to be co-planar and continuous, and the joinder material comprises material originating from the tire receiving ring.

3. The rim of claim 1 wherein the metal tire receiving ring includes a body engaging surface for engaging the annular outer edge surface of the FRP body, the body engaging portion includes a first side and a second side, the first braking surface is disposed adjacent to first side of the body engaging portion, and the second braking surface is disposed adjacent the second side of the body engaging portion, the first and second braking surfaces being disposed in generally parallel planes.

4. The rim of claim 1 wherein the tire receiving ring comprises an aluminum tire receiving ring and the joinder material comprise an aluminum based joinder material formed by subjecting a portion of the tire ring to heat to cause the heated portion to become semi-molten.

5. A fiber reinforced plastic (FRP) based rim for a human powered vehicle comprising:
- an FRP body having first and second side surfaces, an annular inner edge surface and an annular outer edge surface, the annular inner edge surface including at least two spoke receiving ports for receiving and supportively coupling at least two spokes to the FRP body,
- a metal tire receiving ring coupled to the FRP body radially outwardly thereof, the tire receiving ring including first and second, generally parallel continuous braking surfaces wherein each of the first and second braking surfaces includes
- a first end portion,
- a second end portion disposed in an adjacent, co-planar relationship with the first end portion, and
- a joinder material disposed between the first and second ends for joining the first and second end portions.

6. The rim of claim 5 wherein the joinder material is workable to form a joinder material surface co-planar with the first and second end portions to form a continuous juncture between the first and second end portions.

7. The rim of claim 5 wherein the joinder material comprises a machinable joinder material.

8. The rim of claim 7 wherein the tire receiving ring comprises an aluminum tire receiving ring and the joinder material comprise an aluminum based joinder material formed by subjecting a portion of the tire ring to heat to cause a heated portion to become semi-molten.

9. A fiber resin plastic (FRP) based human powered vehicle rim comprising: an FRP body having first and second side surfaces, an annular inner edge surface and the annular outer edge surface, the annular inner edge surface including at least two spoke receiving ports for receiving and supportively coupling at least two spokes to the FRP body,
- a metal tire receiving ring coupled to the FRP body radially outwardly thereof, the tire receiving ring including first and second, generally parallel braking surfaces, each of the first and second braking surfaces including a first end portion, and a second end portion disposed in an adjacent, co-planar relationship with the first end portion, the first and second end portions being joined together to form seamless, continuous braking surfaces,
- further comprising a hub and at least two spokes, each of the spokes including a first end coupled to the FRP body adjacent to the annular inner edge surface, and a second end coupled to the hub and wherein the FRP body comprises a carbon fiber and resin body.

* * * * *